(12) United States Patent
Honda

(10) Patent No.: US 11,364,751 B2
(45) Date of Patent: Jun. 21, 2022

(54) PNEUMATIC TIRE

(71) Applicant: The Yokohama Rubber Co., LTD., Tokyo (JP)

(72) Inventor: Hiroaki Honda, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/278,884

(22) PCT Filed: Jun. 18, 2019

(86) PCT No.: PCT/JP2019/024138
§ 371 (c)(1),
(2) Date: Mar. 23, 2021

(87) PCT Pub. No.: WO2020/075346
PCT Pub. Date: Apr. 16, 2020

(65) Prior Publication Data
US 2021/0309051 A1 Oct. 7, 2021

(30) Foreign Application Priority Data
Oct. 11, 2018 (JP) .............................. JP2018-192676

(51) Int. Cl.
*B60C 15/00* (2006.01)
*B60C 15/04* (2006.01)
(Continued)

(52) U.S. Cl.
CPC .............. *B60C 15/04* (2013.01); *B60C 15/06* (2013.01); *B60C 9/0292* (2013.01); *B60C 2015/0614* (2013.01)

(58) Field of Classification Search
CPC ....... B60C 15/00; B60C 15/02; B60C 15/024; B60C 15/04; B60C 2015/0614; B60C 2015/0617; B60C 9/0292
See application file for complete search history.

(56) References Cited

U.S. PATENT DOCUMENTS 3,107,125 A * 10/1963 Yazell, Jr. ............... B60B 21/10
301/95.108
6,276,417 B1 8/2001 Honbo et al.
(Continued)

FOREIGN PATENT DOCUMENTS

| CN | 105121187 A | 12/2015 |
|---|---|---|
| CN | 106585289 A | 4/2017 |

(Continued)

OTHER PUBLICATIONS

Machine translation of JP 2009-154861, 2009.*

*Primary Examiner* — Justin R Fischer
(74) *Attorney, Agent, or Firm* — Thorpe North & Western

(57) ABSTRACT

In a pneumatic tire mountable on a 5°-tapered rim, a bottom of a bead core is inclined from 0°-5° in a direction in which the bottom diverges toward an outer side in a radial direction as the bottom extends from an inner side in the width direction toward an outer side in the width direction. Each bead portion includes a base, a toe, and a heel. The base is inclined from 8°-12° in a direction in which the bead base portion diverges toward the outer side in the radial direction as the base extends from the inner side toward the outer side in the width direction. The heel has a radius of curvature from 25-30 mm. A rim cushion rubber has a modulus at 100% elongation within a range from 5.0-8.0 MPa. The toe has a displacement between before and after mounting on the rim from 9.0-13.5 mm.

5 Claims, 6 Drawing Sheets

(51) Int. Cl.
*B60C 15/06* (2006.01)
*B60C 9/02* (2006.01)

(56) References Cited

U.S. PATENT DOCUMENTS

| | | |
|---|---|---|
| 2015/0352908 A1 | 12/2015 | Osaki |
| 2017/0106704 A1 | 4/2017 | Osawa et al. |

FOREIGN PATENT DOCUMENTS

| | | | |
|---|---|---|---|
| EP | 982158 | * | 3/2000 |
| EP | 982158 A2 | | 3/2000 |
| EP | 2949483 A1 | | 12/2015 |
| EP | 3156256 A1 | | 4/2017 |
| JP | 2000-62418 A | | 2/2000 |
| JP | 2006-213241 A | | 8/2006 |
| JP | 2009-154861 | * | 7/2009 |
| JP | 2010-12829 A | | 1/2010 |
| JP | 2010-188818 A | | 9/2010 |
| JP | 4934241 B2 | | 5/2012 |
| JP | 2014-156192 A | | 8/2014 |
| JP | 5629275 B2 | | 11/2014 |
| JP | 2017-74834 A | | 4/2017 |
| JP | 2018-30529 A | | 3/2018 |
| WO | 2014/115546 A1 | | 7/2014 |

* cited by examiner

| | CONVENTIONAL EXAMPLE | COMPARATIVE EXAMPLE 1 | COMPARATIVE EXAMPLE 2 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|---|
| RADIUS OF CURVATURE R1 OF HEEL PORTION | 13 mm | 35 mm | 25 mm | 25 mm | 25 mm | 25 mm | 25 mm | 25 mm | 25 mm | 25 mm |
| MODULUS AT 100% ELONGATION OF RIM CUSHION RUBBER | 4 MPa | 5 MPa | 5 MPa | 5 MPa | 5 MPa | 5 MPa | 5 MPa | 5 MPa | 5 MPa | 5 MPa |
| AMOUNT OF DISPLACEMENT OF TOE PORTION | 8 mm | 9 mm | 14.0 mm | 9 mm | 9 mm | 9 mm | 9 mm | 9 mm | 9 mm | 9 mm |
| COMPRESSION RATIO OF RUBBER LOCATED ON INNER SIDE OF BEAD CORE IN TIRE RADIAL DIRECTION | 40% | 45% | 45% | 40% | 60% | 45% | 55% | 45% | 45% | 45% |
| W1/W2 | 0.67 | 0.67 | 0.67 | 0.67 | 0.67 | 0.67 | 0.67 | 0.67 | 0.67 | 0.60 |
| RELATIONSHIP BETWEEN RADIUS OF CURVATURE R1 OF HEEL PORTION AND RADIUS OF CURVATURE R2 OF CARCASS | R1 < R2 | R1 > R2 | R1 > R2 | R1 > R2 | R1 > R2 | R1 > R2 | R1 > R2 | R1 < R2 | R1 < R2 | R1 < R2 |
| RADIUS OF CURVATURE R2 OF CARCASS | 15 mm | 15 mm | 15 mm | 15 mm | 15 mm | 15 mm | 15 mm | 15 mm | 45 mm | 50 mm |
| RIM SLIP RESISTANCE | 100 | 88 | 112 | 100 | 107 | 103 | 106 | 105 | 106 | 103 |
| MOUNTABILITY ON RIMS | 100 | 110 | 80 | 108 | 102 | 107 | 103 | 107 | 107 | 109 |

FIG. 5A

| | EXAMPLE 8 | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|---|
| RADIUS OF CURVATURE R1 OF HEEL PORTION | 25 mm | 30 mm | 30 mm | 30 mm | 30 mm | 30 mm | 30 mm | 30 mm | 30 mm |
| MODULUS AT 100% ELONGATION OF RIM CUSHION RUBBER | 5 MPa | 5 MPa | 8 MPa | 8 MPa | 8 MPa | 8 MPa | 8 MPa | 8 MPa | 8 MPa |
| AMOUNT OF DISPLACEMENT OF TOE PORTION | 9 mm | 9 mm | 9 mm | 13.5 mm | 13.5 mm | 13.5 mm | 13.5 mm | 13.5 mm | 13.5 mm |
| COMPRESSION RATIO OF RUBBER LOCATED ON INNER SIDE OF BEAD CORE IN TIRE RADIAL DIRECTION | 45% | 45% | 45% | 45% | 45% | 45% | 55% | 50% | 50% |
| W1/W2 | 0.70 | 0.70 | 0.70 | 0.70 | 0.80 | 0.75 | 0.75 | 0.75 | 0.75 |
| RELATIONSHIP BETWEEN RADIUS OF CURVATURE R1 OF HEEL PORTION AND RADIUS OF CURVATURE R2 OF CARCASS | R1 < R2 | R1 < R2 | R1 < R2 | R1 < R2 | R1 < R2 | R1 < R2 | R1 < R2 | R1 < R2 | R1 < R2 |
| RADIUS OF CURVATURE R2 OF CARCASS | 50 mm | 50 mm | 50 mm | 50 mm | 70 mm | 70 mm | 70 mm | 70 mm | 75 mm |
| RIM SLIP RESISTANCE | 110 | 110 | 114 | 120 | 125 | 122 | 127 | 124 | 126 |
| MOUNTABILITY ON RIMS | 107 | 112 | 112 | 108 | 103 | 108 | 104 | 108 | 106 |

FIG. 5B

PNEUMATIC TIRE

TECHNICAL FIELD

The present technology relates to a pneumatic tire.

BACKGROUND ART

A pneumatic tire is mounted on a rim wheel by fitting, to a rim of a rim wheel, a bead portion with a bead core corresponding to an annular member including a plurality of bead wires bundled. The bead portion is a portion that is actually mounted on the rim wheel in a case where the pneumatic tire is mounted on the rim wheel, and thus, in some known pneumatic tires, various improvements are made to the bead portions to achieve desired performance. For example, in the pneumatic tire described in Japan Patent No. 5629275, the bead cores are shaped to be wider in the tire width direction to reduce localized pressure, suppressing damage to the rim. Additionally, in the tire described in Patent Document 1, a bead heel portion of the bead base portion in a meridian cross-section has a round contour with a large radius of curvature, thus ensuring easiness of mounting on the rim.

Additionally, in a heavy duty pneumatic radial tire described in Japan Patent No. 4934241, a predetermined range is set for the ratio, to the volume of rubber chafer displaced and deformed by a rim bead sheet, of a space in which rubber chafer displaced and deformed due to mounting, is received, the space being located in a corner where the rim bead sheet is continuous with a rim flange. This configuration prevents separation of the rubber chafer. Additionally, a heavy duty radial tire described in Japan Unexamined Patent Publication No. 2010-188818 has a compression factor and a ratio of a bead core effective width to a bead core maximum width, which are each set to fall within a predetermined range to improve a rim slip resistance without causing weight increase. The compression factor is defined by dividing a compression allowance, which is a difference between a total thickness before mounting on a rim of only a rubber part on an inner side in a radial direction than a bead core and a total thickness after mounting on the rim, by the total thickness before mounting on the rim.

Here, pneumatic tires are mounted on various types of vehicles, and in construction vehicles, corresponding to a type of such vehicles, a large torque may be transmitted to the wheels during construction operations. For example, in a wheel loader, which is an example of a construction vehicle, in a case where a bucket provided at a front end of the vehicle is used to scoop up the earth and sand and the like, a large load acts on the front wheels, and thus traveling in this state causes the large torque to be transmitted to the front wheels. In recent years, in this type of wheel loader, high horsepower has been achieved, leading to a tendency toward an increase in torque transmitted to the wheels, and thus the wheels are often used under stringent conditions. Thus, in the wheels mounted on the construction vehicle such as a wheel loader, so-called rim slippage, corresponding to slippage between the rim and the bead portion, may occur due to the increased horsepower of the vehicle. In other words, the torque transmitted to the wheels is transmitted from the rim wheel to the pneumatic tire via the bead portion, and an excessively high torque transmitted from the rim wheel to the bead portion may cause slippage between the rim and the bead portion. The rim slippage thus occurring between the rim wheel and the pneumatic tire may wear rubber in a bead base portion corresponding to an inner circumferential surface of the bead portion and coming into contact with the rim, leading to damage to the bead base portion.

A possible cause of such rim slippage is an insufficient fastening force exerted on the rim by the bead portion. A possible method for increasing the fastening force of the bead portion is to reduce the inner diameter of the bead core of the bead portion or to reduce the circumferential length of the bead heel portion of the bead base portion. However, the reduced inner diameter of the bead core or the reduced circumferential length of the bead heel portion increases the fastening force of the bead portion, but may degrade mountability of the pneumatic tire on the rim in a case of mounting on the rim wheel. The degraded mountability on the rim may cause an eccentric fitting in which the bead portions are fitted eccentrically to the rim wheel, defective seating of the bead portion on the rim wheel, or the like, leading to a reduced fastening force. However, in a case where the inner diameter of the bead core or the circumferential length of the bead heel portion is set with the mountability on the rim emphasized, the fastening force exerted on the rim by the bead portion may be insufficient, leading to the likelihood of rim slippage. Thus, suppressing rim slippage without degrading the mountability on rims has been very difficult.

SUMMARY

The present technology provides a pneumatic tire that can suppress rim slippage while ensuring mountability on rims.

A pneumatic tire according to an embodiment of the present technology to be mounted on a 5°-tapered specified rim includes a pair of bead portions, a bead core, and a rim cushion rubber. The pair of bead portions are disposed on both sides of a tire equatorial plane in a tire width direction. The bead core is provided in each of the pair of bead portions. The rim cushion rubber is disposed on an inner side in a tire radial direction of the bead core in each of the pair of bead portions. The bead core has a hexagonal shape in a tire meridian cross-section. A bead core bottom as an inner circumferential surface of the bead core is inclined within a range of 0° or more and 5° or less with respect to a tire rotation axis in a direction in which the bead core bottom diverges toward an outer side in a tire radial direction as the bead core bottom extends from an inner side in the tire width direction toward an outer side in the tire width direction. Each of the pair of bead portions includes a bead base portion, a toe portion, and a heel portion. The bead base portion is an inner circumferential surface of each of the pair of bead portions. The toe portion is located on an inner side of the bead base portion in the tire width direction. The heel portion is located on an outer side of the bead base portion in the tire width direction. The bead base portion is linearly formed in the tire meridian cross-section. The bead base portion is inclined within a range of 8° or more and 12° or less with respect to the tire rotation axis in a direction in which the bead base portion diverges toward the outer side in the tire radial direction as the bead base portion extends from the inner side in the tire width direction toward the outer side in the tire width direction. The heel portion has a shape in the tire meridian cross-section formed in an arc shape having a radius of curvature within a range of 25 mm or more and 30 mm or less. The rim cushion rubber has a modulus at 100% elongation within a range of 5.0 MPa or more and 8.0 MPa or less. The toe portion has an amount of displacement in the tire radial direction between before and after mounting on the specified rim within a range of 9.0 mm or more and 13.5 mm or less.

In the pneumatic tire described above, preferably, when the pneumatic tire is mounted on the specified rim, a compression ratio of a rubber located on the inner side of the bead core in the tire radial direction is within a range of 45% or more and 55% or less at a position on an inner side in the tire radial direction of a center of the bead core bottom in the tire meridian cross-section.

Additionally, the pneumatic tire described above is preferably as follows. The pneumatic tire includes a carcass. The carcass is extended between the pair of the bead portions. The carcass runs through the inner side in the tire radial direction of the bead core and is folded back in the tire width direction in each of the pair of bead portions. The carcass has a radius of curvature R2 in the tire meridian cross-section at a position on an inner side in the tire radial direction of the bead core bottom within a range of 50 mm or more and 70 mm or less. The radius of curvature R2 has a relationship with a radius of curvature R1 of the heel portion in the tire meridian cross-section of R1<R2.

Additionally, in the pneumatic tire described above, a relationship between a maximum width W1 in the tire meridian cross-section of the bead core and a bead width W2 as a distance in the tire width direction between an outer end portion of the bead core in the tire width direction and a leading edge portion of the toe portion is preferably within a range $0.65 \leq (W1/W2) \leq 0.75$.

The pneumatic tire according to an embodiment of the present technology is effective in allowing suppression of rim slippage while ensuring mountability on rims.

BRIEF DESCRIPTION OF DRAWINGS

FIG. 5A is a table showing results of performance evaluation tests of pneumatic tires.

FIG. 5B is a table showing results of performance evaluation tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are essentially identical or that can be substituted or easily conceived by one skilled in the art.

Herein, "tire radial direction" refers to the direction orthogonal to the tire rotation axis (not illustrated) which is the rotation axis of a pneumatic tire 1. "Inner side in the tire radial direction" refers to a side toward the tire rotation axis in the tire radial direction. "Outer side in the tire radial direction" refers to a side away from the tire rotation axis in the tire radial direction. "Tire circumferential direction" refers to the circumferential direction with the tire rotation axis as the center axis. Additionally, "tire width direction" refers to a direction parallel with the tire rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane that is orthogonal to the tire rotation axis and that runs through the center of the tire width of the pneumatic tire 1. The tire equatorial plane CL aligns, in a position in the tire width direction, with the center line in the tire width direction corresponding to the center position of the pneumatic tire 1 in the tire width direction. "Tire width" is the width in the tire width direction between portions located on the outermost side in the tire width direction, or in other words, the distance between the portions that are the most distant from the tire equatorial plane CL in the tire width direction. "Tire equator line" refers to the line along the tire circumferential direction of the pneumatic tire 1 that lies on the tire equatorial plane CL. In the description below, "tire meridian section" refers to a cross-section of the tire taken along a plane that includes the tire rotation axis.

Figure 1:
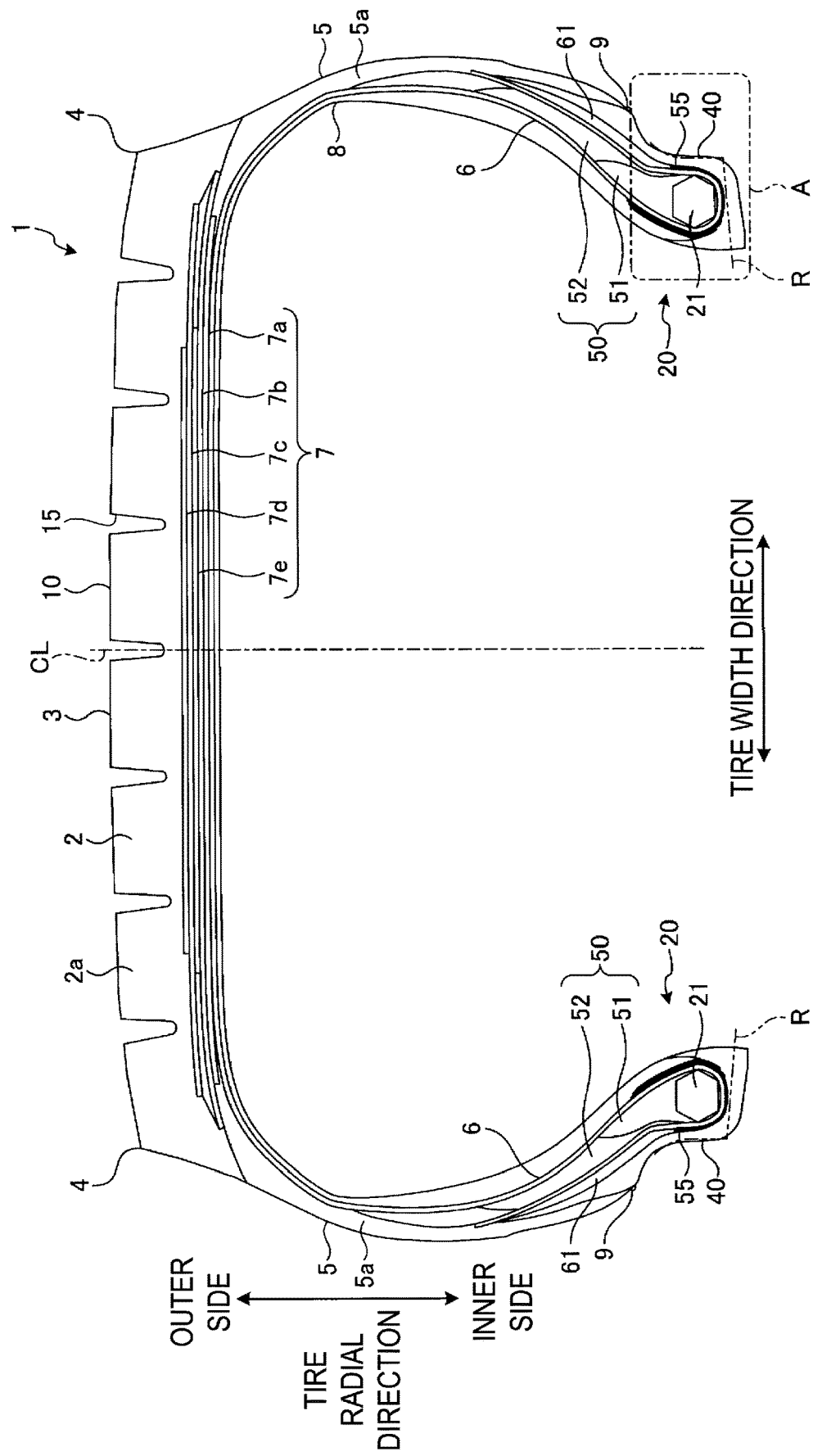
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. The pneumatic tire 1 according to the embodiment is a radial tire for a construction vehicle referred to as an off the road tire (OR tire). The pneumatic tire 1, illustrated in FIG. 1 as the present embodiment, is provided with a tread portion 2 in an outermost projection portion in the tire radial direction as viewed in a meridian cross-section, and the tread portion 2 is formed of a tread rubber 2a that is a rubber composition. The surface of the tread portion 2, that is, a portion that comes into contact with a road surface during traveling of a vehicle (not illustrated) mounted with the pneumatic tire 1, is formed as a ground contact surface 3.

A plurality of grooves such as circumferential grooves 15 extending in the tire circumferential direction and lug grooves extending in the tire width direction are formed in the ground contact surface 3 of the tread portion 2, and a plurality of land portions 10 are defined and formed in the tread portion 2 by the grooves.

Additionally, both ends of the tread portion 2 in the tire width direction are formed as shoulder portions 4, and sidewall portions 5 are each disposed from the corresponding shoulder portion 4 to a predetermined position on an inner side in the tire radial direction. In other words, the sidewall portions 5 are disposed at two positions on the respective sides of the pneumatic tire 1 in the tire width direction. The sidewall portion 5 includes a sidewall rubber 5a, which is a rubber composition. Additionally, a rim check line 9 is formed at a position on a more inner side in the tire radial direction in each of the sidewall portions 5 on both sides in the tire width direction. The rim check line 9 projects from the surface of the sidewall portion 5 and is formed all around the circumference in the tire circumferential direction.

Furthermore, a bead portion 20 is located on the inner side of each sidewall portion 5 in the tire radial direction, and like the sidewall portion 5, the bead portion 20 is disposed at two positions on the respective sides of the tire equatorial plane CL. In other words, a pair of the bead portions 20 are disposed on both sides of the tire equatorial plane CL in the tire width direction. Each of the pair of bead portions 20 is provided with a bead core 21, and a bead filler 50 is provided on the outer side of each bead core 21 in the tire radial direction. The bead core 21 is formed by winding a bead wire, which is a steel wire, into a ring shape. The bead filler 50 is a rubber material disposed in a space formed by folding back an end portion of a carcass 6 described below outward in the tire width direction at the position of the bead core 21. Additionally, the bead filler 50 includes a lower filler 51 disposed in contact with an outer circumferential surface of the bead core 21, and an upper filler 52 disposed at a position on a more outer side in the tire radial direction than the lower filler 51.

The bead portion 20 is configured to be mountable on a rim wheel including a 5°-tapered specified rim R. Specifically, the pneumatic tire 1 according to the present embodiment can be mounted on a specified rim R including a portion fitted to the bead portion 20 the portion inclined in a direction toward an outer side in the tire radial direction as the portion extends from an inner side toward an outer side in the tire width direction at an inclination angle of 5°±1° with respect to the rotation axis of the rim wheel. Note that "specified rim" refers to an "applicable rim" defined by the JATMA (The Japan Automobile Tyre Manufacturers Association, Inc.), a "Design Rim" defined by the TRA (The Tire and Rim Association, Inc., or a "Measuring Rim" defined by the ETRTO (The European Tyre and Rim Technical Organisation).

A belt layer 7 is provided on the inner side of the tread portion 2 in the tire radial direction. The belt layer 7 has a multilayer structure in which three or more belt plies are layered, and in a typical OR tire, four to eight belt plies are layered. In the present embodiment, the belt layer 7 is layered with five belt plies 7a, 7b, 7c, 7d, and 7e. The belt plies 7a, 7b, 7c, 7d, and 7e included in the belt layer 7 are formed by coating a plurality of belt cords made of steel or an organic fiber material with coating rubber and rolling the resultant belt cords. Additionally, the belt cords of the belt plies 7a, 7b, 7c, 7d, and 7e have different inclination angles with respect to the tire circumferential direction, and the belt plies are layered such that the inclination directions of the belt cords intersect one another, and are thus configured into a what is called crossply structure. Thus, the structural strength of the belt layer 7 is increased. The five belt plies 7a, 7b, 7c, 7d, and 7e include, for example, a large-angle belt 7a, a pair of cross belts 7b and 7c, a belt cover 7d, and a circumferential reinforcing layer 7e.

On the inner side of the belt layer 7 in the tire radial direction and on a tire equatorial plane CL side of the sidewall portion 5, the carcass 6 used as a reinforcing layer is continuously provided. The carcass 6 has a single layer structure made of one carcass ply or a multilayer structure made of a plurality of carcass plies, and extends between the bead cores 21 on the respective sides in the tire width direction in a toroidal shape, forming the backbone of the tire. Specifically, the carcass 6 is extended between the pair of bead portions 20, and is disposed extending from one bead portion 20 of the pair of bead portions 20 to the other bead portion 20 located on both sides in the tire width direction. Additionally, the carcass 6 runs through the inner side in the tire radial direction of the bead core 21 and is folded back in the tire width direction in the bead portion 20 so as to wrap around the bead core 21 and the bead filler 50. In other words, the carcass 6 runs through the inner side in the tire radial direction of the bead core 21 from the inner side in the tire width direction of the bead core 21 and is folded back around the bead core 21 in the bead portion 20 so as to be disposed extending to the outer side in the tire width direction of the bead core 21. As a result, the carcass 6 is disposed between the inner side and the outer side in the tire width direction of the bead core 21.

The carcass ply of the carcass 6 disposed in this manner is formed by coating a plurality of carcass cords formed of cord members made from steel or an organic fiber material, such as aramid, nylon, polyester, or rayon, with coat rubber, which is a rubber member, and rolling the resultant cords.

Additionally, the carcass 6 has a carcass angle from 85° to 95°; the carcass angle being the inclination angle of the carcass cords with respect to the tire circumferential direction.

Additionally, an innerliner 8 is formed along the carcass 6 on the inner side of the carcass 6 or on the inner side of the carcass 6 in the pneumatic tire 1.

Figure 2:
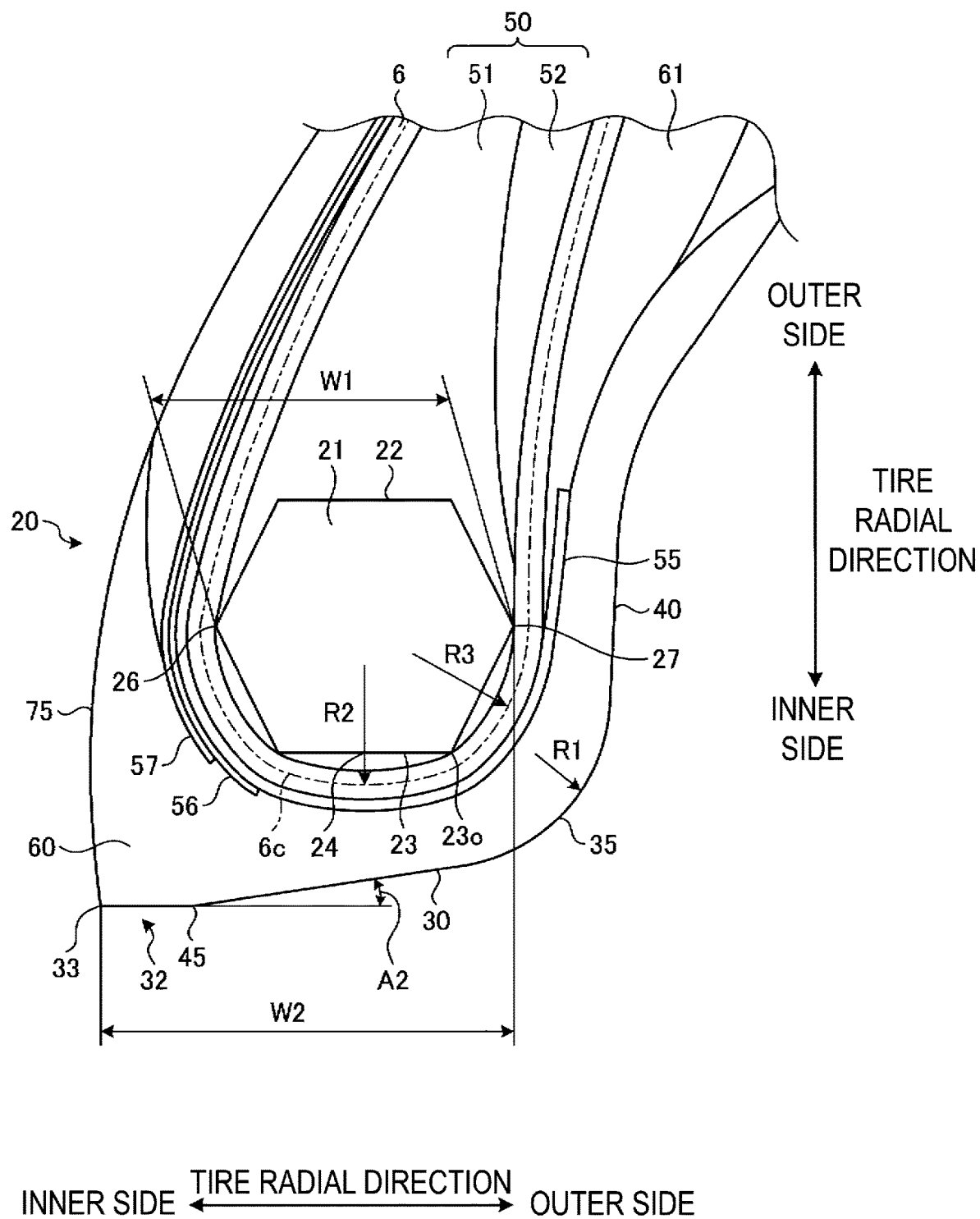
FIG. 2 is a detailed view of a portion A of FIG. 1.

FIG. 2 is a detailed view of the portion A of FIG. 1. A chafer including a reinforcing layer reinforcing the carcass 6, is disposed in a portion of the carcass 6 that is folded back around the bead core 21. Examples of the chafer applied include a steel chafer formed using steel cords as cord members, or a nylon chafer formed using cord members made from an organic fiber material. The nylon chafer includes, for example, a sheet-shaped member formed by arranging and rolling a plurality of organic fiber cords, a fabric formed by weaving a plurality of organic fiber cords, or a composite material formed by rubberizing the sheet-shaped member or the fabric. In the present embodiment, three chafers are used including a steel chafer 55 formed using steel cords, and sub-chafers 56 and 57 including nylon chafers, and the three chafers are disposed in a layered manner.

Of these chafers, the steel chafer 55 is disposed on top of the carcass 6 outward of the folded back portion of the carcass 6, and is, like the carcass 6, folded back around the bead core 21 from the inner side to the outer side in the tire width direction and disposed continuously in the tire circumferential direction. That is, in a portion where the carcass 6 is positioned on the inner side of the bead core 21 in the tire width direction, the steel chafer 55 is located on the inner side of the carcass 6 in the tire width direction, and in a portion where the carcass 6 is positioned on the inner side of the bead core 21 in the tire radial direction, the steel chafer 55 is located on the inner side of the carcass 6 in the tire radial direction, and in a portion where the carcass 6 is positioned on the outer side of the bead core 21 in the tire width direction, the steel chafer 55 is located on the outer side of the carcass 6 in the tire width direction.

Additionally, the two sub-chafers 56 and 57 are disposed on top of each other on the side, in the thickness direction, of the steel chafer 55 opposite to the side where the carcass 6 is located. In addition, unlike the steel chafer 55, the sub-chafers 56, 57 are not folded back around the bead core 21 from the inner side to the outer side in the tire width direction, are mainly disposed from a position in the range on the inner side of the bead core 21 in the tire width direction to a position on the outer side in the tire radial direction, and are provided continuously in the tire circumferential direction. Assuming that, in the three chafers in the tire meridian cross-section, corresponding to the meridian cross-section of the pneumatic tire 1, the side on which the bead core 21 is located in the thickness direction of the chafers refers to inner side, and the side opposite to the side where the bead core 21 is located refers to outward, the steel chafer 55 is disposed most inner side, the sub-chafer 56 is disposed outward of the steel chafer 55, and the sub-chafer 57 is disposed outward of the sub-chafer 56, as described above. The sub-chafers 56 and 57 disposed on the outer side of the steel chafer 55 are auxiliary reinforcing layers.

Additionally, a shock absorbing rubber 61 is disposed by being sandwiched between the carcass 6 and the steel chafer 55. Specifically, the shock absorbing rubber 61 is disposed between a portion of the carcass 6 located on the outer side of the bead core 21 in the tire width direction and a portion of the steel chafer 55 located on the outer side of the bead core 21 in the tire width direction. Additionally, the shock absorbing rubber 61 is also disposed in a region on the outer side of the steel chafer 55 in the tire radial direction in the tire meridian cross section. That is, the shock absorbing rubber 61 is disposed between the carcass 6 and the steel chafer 55 within the range in which the steel chafer 55 is disposed in the tire radial direction, and the shock absorbing rubber 61 is disposed along a portion located on the outer side of the bead core 21 in the tire width direction to a region on the outer side of the steel chafer 55 in the tire radial direction.

Furthermore, a rim cushion rubber 60 is disposed on the inner side in the tire radial direction of the bead core 21 in the bead portion 20. In detail, the rim cushion rubber 60 is disposed outside the steel chafer 55, and like the steel chafer 55, the rim cushion rubber 60 is disposed from the inner side of the bead core 21 in the tire width direction to the inner side in the tire radial direction and the outer side in the tire width direction, and is provided continuously in the tire circumferential direction. The rim cushion rubber 60 disposed in this manner forms a contact surface of the bead portion 20 for a flange of the specified rim R. Additionally, a modulus at 100% elongation, which indicates elastic modulus, of the rim cushion rubber is within a range of 5.0 MPa or more and 8.0 MPa or less. The modulus at 100% elongation in this case is measured in a tensile test at 23° C. in conformance with JIS (Japanese Industrial Standard) K6251 (using a dumbbell No. 3) and indicates tensile stress at 100% elongation.

Additionally, the bead core 21 formed by rolling a bead wire in a ring shape is formed substantially in a hexagonal shape as viewed in the meridian cross-section. Specifically, the bead core 21 is formed such that a bead core bottom 23 corresponding to an inner circumferential surface of the bead core 21 and an outer circumferential surface 22 of the bead core in the overall view of the bead core 21 are substantially parallel to each other, and the bead core 21 is formed, at positions on the respective end sides in the tire width direction, in a substantially hexagonal shape having corner portions projecting in the tire width direction, the bead core bottom 23, which is an inner circumferential surface of the bead cores 21 when viewed throughout the bead core 21, and has corner portions projecting in the tire width direction at positions on both end sides in the tire width direction.

Note that in this case, the "bead core bottom 23 of the bead core 21" refers to, in the tire meridian cross-section, a surface indicated by an imaginary straight line contacting a portion of a plurality of bead wires disposed in a row at a position on the inner side of the bead core 21 in the tire radial direction to form the surface of the bead core 21, the portion being exposed from the surface side of the bead core 21. Similarly, the "outer circumferential surface 22 of the bead core 21" refers to, in a case where the pneumatic tire 1 is viewed in the tire meridian cross-section, a surface indicated by an imaginary straight line contacting a portion of a plurality of bead wires disposed in a row at a position on the outer side of the bead core 21 in the tire radial direction to form the surface of the bead core 21, the portion being exposed from the surface side of the bead core 21.

Additionally, the bead portion 20 includes a bead base portion 30 as an inner circumferential surface of the bead portion 20, a toe portion 32 located on the inner side of the bead base portion 30 in the tire width direction, a heel portion 35 located on the outer side of the bead base portion 30 in the tire width direction, and a back surface portion 40 located on the outer side of the heel portion 35 in the tire radial direction and facing the outer side in the tire width direction. Of these, the bead base portion 30 is located on the inner side of the bead core 21 in the tire radial direction, and is disposed in a range of the most part of the range of the bead core bottom 23 in the tire width direction. Additionally, the bead base portion 30 is linearly formed in the tire meridian cross-section and is inclined with respect to the tire rotation axis in a direction in which the bead base portion 30 diverges toward the outer side in the tire radial direction as the bead base portion 30 extends from the inner side in the tire width direction toward the outer side in the tire width direction.

Note that in this case, a state in which the bead base portion 30 is linearly formed refers to a state in which, when both ends of the bead base portion 30 in the tire width direction are connected by an imaginary straight line in the tire meridian cross-section, the maximum distance between the portion of the bead base portion 30 separated from the imaginary straight line and the imaginary straight line is not greater than 2.5 mm.

The bead base portion 30 inclined with respect to the tire rotation axis is inclined within a range of 8° or more and 12° or less with respect to the tire rotation axis in a direction in which the bead base portion 30 diverges toward the outer side in the tire radial direction as the bead base portion 30 extends from the inner side in the tire width direction toward the outer side in the tire width direction. In other words, the bead base portion 30 is formed having an angle A2 with respect to a line parallel to the tire rotation axis in a range of 8° or more and 12° or less.

Note that the angle A2 of the bead base portion 30 is an angle in a state where a spacing in the tire width direction between the pair of bead portions 20 located on both sides of the tire equatorial plane CL in the tire width direction is set to a spacing when the pneumatic tire 1 is mounted on a specified rim R. In other words, since the pneumatic tire 1 deflects, the angle of the bead base portion 30 also changes according to the deflection state of the pneumatic tire 1. With the pneumatic tire 1 not mounted on the specified rim R, the bead base portion 30 has the angle A2 with respect to the tire rotation axis in the state where the spacing in the tire width direction between the bead portions 20 located on both sides in the tire width direction is set to the spacing when the pneumatic tire 1 is mounted on the specified rim R within the range of 8° or more and 12° or less.

The toe portion 32 located on the inner side of the bead base portion 30 in the tire width direction has an angle with respect to the tire rotation axis smaller than the angle A2 of the bead base portion 30 with respect to the tire rotation axis. Specifically, the bead base portion 30 and the toe portion 32 are connected by a bent portion 45, which is a portion that bends in a direction of projecting to the inner side in the tire radial direction in an inner circumference surface of the bead portion 20. The bent portion 45 has a position in the tire width direction at or near the identical position of a bead core inner end portion 26, which is an inner end portion of the bead core 21 in the tire width direction, in the tire width direction. The bead base portion 30 is a portion located on the outer side of the bent portion 45 in the tire width direction in the inner circumferential surface of the bead portion 20. The toe portion 32 is a portion located on the inner side of the bent portion 45 in the tire width direction in the inner circumferential surface of the bead portion 20. The toe portion 32 located on the inner side of the bent portion 45 in the tire width direction has an angle with respect to the tire rotation axis smaller than the angle A2 of the bead base portion 30 with respect to the tire rotation axis. The toe portion 32 is formed at the angle close to parallel to the tire rotation axis. The toe portion 32 has a leading edge portion 33 as an end portion on the inner side in the tire width direction of the toe portion 32 connected to a tire inner surface 75.

The heel portion 35 is formed in an arc shape in which a shape in the tire meridian cross-section projects in an oblique direction with respect to the inner side in the tire radial direction and the outer side in the tire width direction and is connected to the bead base portion 30 and the back surface portion 40. In other words, the bead base portion 30 generally faces the inner side in the tire radial direction, the back surface portion 40 generally faces the outer side in the tire width direction, and thus the bead base portion 30 and the back surface portion 40 differ in the facing orientation, but the heel portion 35 is located between the bead base portion 30 and the back surface portion 40 having the different orientations and is connected to both. That is, the heel portion 35 formed in the arc shape has one end in the tire meridian cross-section connected to the bead base portion 30 and the other end connected to the back surface portion 40. The heel portion 35 formed in this manner has a radius of curvature R1 of the arc shape in the tire meridian cross-section in a range of 25 mm or more and 30 mm or less.

Figure 3:
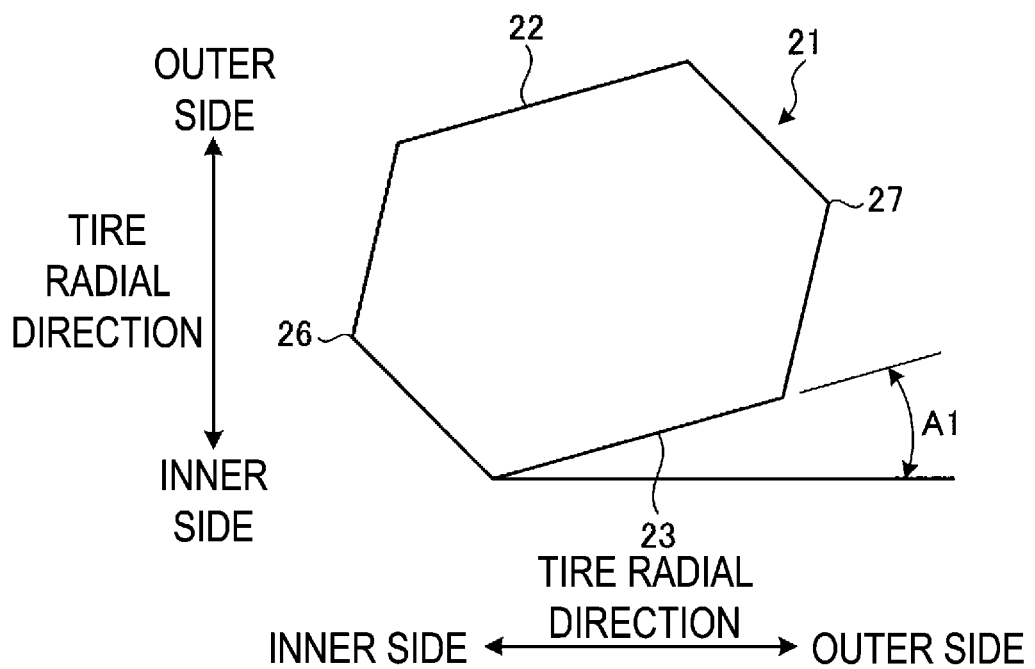
FIG. 3 is an explanatory diagram of the inclination of a bead core bottom.

FIG. 3 is an explanatory diagram of the inclination of the bead core bottom 23. The bead core 21 having a hexagonal cross-sectional shape is inclined within the range of 0° or more and 5° or less with respect to the tire rotation axis in a direction in which the bead core bottom 23 diverges toward the outer side in the tire radial direction as the bead core bottom 23 extends from the inner side in the tire width direction toward the outer side in the tire width direction. Specifically, the bead core bottom 23 is formed parallel to the tire rotation axis, or is formed slightly inclined in the direction in which the bead core bottom 23 diverges toward the outer side in the tire radial direction as the bead core bottom 23 extends from the inner side in the tire width direction toward the outer side in the tire width direction, and an angle A1 to a line parallel to the tire rotation axis is within the range of 0° or more and 5° or less. Similarly to the angle A2 of the bead base portion 30, with the pneumatic tire 1 not mounted on the specified rim R, the angle A1 of the bead core bottom 23 is an angle in the state where the spacing in the tire width direction between the bead portions 20 located on both sides in the tire width direction is set to the spacing when the pneumatic tire 1 is mounted on the specified rim R.

The carcass 6 runs through the inner side in the tire radial direction from the inner side of the bead core 21 in the tire width direction and is folded back to the outer side in the tire width direction in the bead portion 20. At this time, the carcass 6 curves and is folded back around the bead core 21 in an arc shape in the tire meridian cross-section. Thus, the carcass 6 folded back in the bead portion 20 has a radius of curvature R2 in the tire meridian cross-section at a position on the inner side in the tire radial direction of the bead core bottom 23 in a range of 50 mm or more and 70 mm or less. Additionally, the carcass 6 has a radius of curvature R3 at a portion located between a position opposed to an outer end portion 23o in the tire width direction of the bead core bottom 23 and a position opposed to a bead core outer end portion 27, which is an outer end portion of the bead core 21 in the tire width direction, within a range of 45 mm or more and 65 mm or less.

In this case, the radii of curvature R2 and R3 of the carcass 6 are radii of curvature at a position of a center line 6c of a thickness of the carcass 6 in the tire meridian cross-section. In detail, the radius of curvature R2 of the carcass 6 at the position on the inner side in the tire radial direction of the bead core bottom 23 is a radius of curvature at a position on the inner side in the tire radial direction of a bead core bottom center 24, which is the center of the bead core bottom 23 in the tire width direction.

In the carcass 6 thus formed, a relationship between the radius of curvature R2 at the position on the inner side in the tire radial direction of the bead core bottom 23 and the radius of curvature R1 of the heel portion 35 of the carcass 6 in the tire meridian cross-section is R1<R2. Furthermore, in the carcass 6, a relationship between the radius of curvature R3 at the portion located between the position opposed to the outer end portion 23o of the bead core bottom 23 and the position opposed to the bead core outer end portion 27 and the radius of curvature R1 of the heel portion 35 in the carcass 6 is R1<R3.

Additionally, the bead portion 20 has a relationship between a maximum width W1 of the bead core 21 in the tire meridian cross-section and a bead width W2 as a distance between the leading edge portion 33 of the toe portion 32 and the bead core outer end portion 27 in the tire width direction of within the range 0.65≤(W1/W2)≤0.75. In this case, the maximum width W1 of the bead core 21 is a distance between the bead core inner end portion 26 and the bead core outer end portion 27 of the bead core 21 in the tire meridian cross-section.

Figure 4:
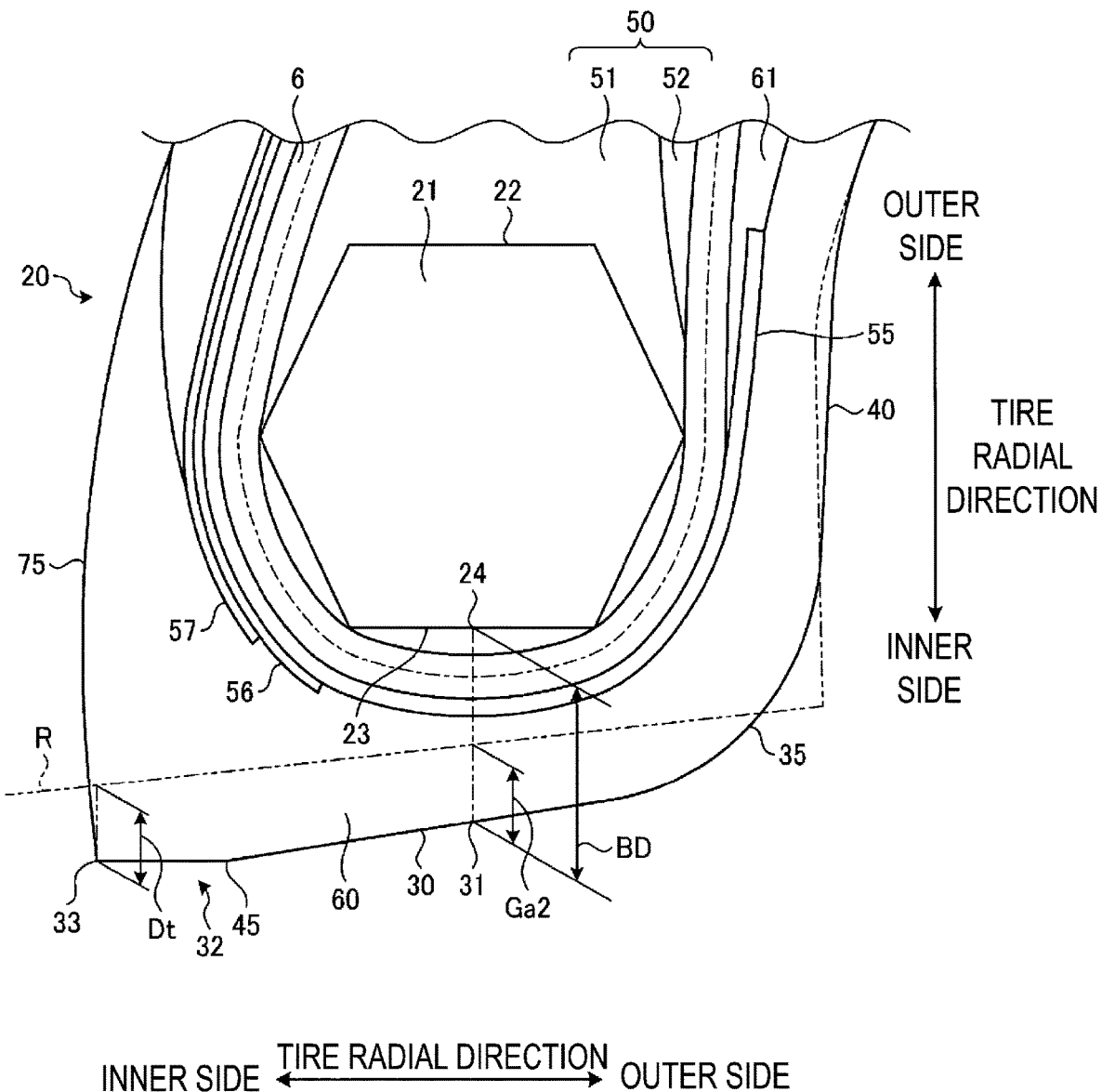
FIG. 4 is an explanatory diagram of an amount of displacement of a bead portion between before and after mounting on a specified rim.

FIG. 4 is an explanatory diagram of an amount of displacement of the bead portion 20 between before and after mounting on the specified rim R. The toe portion 32 has an amount of displacement Dt in the tire radial direction between before and after the mounting on the specified rim R in a range of 9.0 mm or more and 13.5 mm or less. The amount of displacement Dt in this case is a difference in dimension in the tire radial direction between any position of the toe portion 32 before mounting the pneumatic tire 1 on the specified rim R and the identical position of the toe portion 32 when the pneumatic tire 1 is mounted on the specified rim R. In other words, a diameter of the inner circumferential surface of the bead portion 20 is smaller than a diameter of a fitting surface of the specified rim R to the bead portion 20. Accordingly, when the pneumatic tire 1 is mounted on the specified rim R, compression of a rubber member, such as the rim cushion rubber 60, positioned on the inner side of the bead core 21 in the tire radial direction increases the diameter of the inner circumferential surface of the bead portion 20, and the bead portion 20 fits to the specified rim R. Accordingly, when the pneumatic tire 1 is mounted on the specified rim R, the diameter of the toe portion 32 around the tire rotation axis also becomes larger than the diameter of the toe portion 32 before the pneumatic tire 1 is mounted on the specified rim R.

The pneumatic tire 1 according to the present embodiment has the amount of displacement Dt in the tire radial direction of the toe portion 32 that changes the position in the tire radial direction between before the mounting on the specified rim R and after the mounting on the specified rim R within the range of 9.0 mm or more and 13.5 mm or less. For example, in the toe portion 32, the amount of displacement Dt of the leading edge portion 33 in the tire radial direction between before and after the pneumatic tire 1 is mounted on the specified rim R is within the range of 9.0 mm or more and 13.5 mm or less.

When the pneumatic tire 1 is mounted on the specified rim R, as described above, the compression of the rubber positioned on the inner side in the tire radial direction of the bead core 21 in the bead portion 20 causes the bead portion 20 to fit to the specified rim R. Accordingly, when the pneumatic tire 1 is mounted on the specified rim R, a pressure from the outer side to the inner side in the tire radial direction can be applied from the bead portion 20 to the specified rim R, enabling a fitting force to be exerted on the specified rim R. As described above, in a case where the pneumatic tire 1 is mounted on the specified rim R, the compression ratio of the rubber located on the inner side of the bead core 21 in the tire radial direction is within the range of 45% or more and 55% or less at a position on the inner side of the bead core bottom center 24 in the tire radial direction in the tire meridian cross-section.

In this case, the compression ratio of the rubber corresponds to a ratio of a thickness Ga2 of the rubber member compressed in the tire radial direction in a case where the pneumatic tire 1 is mounted on the specified rim R to a thickness Ga1 obtained by subtracting the thickness of the members other than the rubber member, such as the cord members of the carcass 6 and the chafer, from a distance BD in the tire radial direction between the bead core bottom center 24 and the bead base portion 30 in the time meridian cross-section before the pneumatic tire 1 is mounted on the specified rim R. In other words, in a case where the pneumatic tire 1 is mounted on the specified rim R, a compression ratio Z of the rubber located on the inner side of the bead core 21 in the tire radial direction has a value calculated by Formula (1) below. In the pneumatic tire 1 according to the present embodiment, the compression ratio Z calculated by Formula (1) is within the range of 45% or more and 55% or less.

$$\text{Compression ratio } Z = (Ga2/Ga1) \times 100 \quad (1)$$

Note that the thickness Ga2 of the rubber member compressed in the tire radial direction in a case where the pneumatic tire 1 is mounted on the specified rim R used in Formula (1) is specifically defined as an amount of displacement in the tire radial direction between before and after mounting the pneumatic tire 1 on the specified rim R at a reference position 31, which is a portion of the bead base portion 30 corresponding to the identical position of the bead core bottom center 24 in the tire width direction. The bead portion 20 is preferably formed such that the compression ratio Z is within a range of 45% or more and 55% or less considering not only the thickness of the rim cushion rubber 60 positioned on the inner side in the tire radial direction of the bead core 21, but also the thickness of the coating rubber of the carcass 6 and a thickness of a member other than the rubber member, such as cord members of the carcass 6 and the chafer.

In a case where the pneumatic tire 1 configured as described above is mounted on a vehicle, first, the bead base portion 30, the toe portion 32, and the heel portion 35 are fitted to the specified rim R of the rim wheel to mount the pneumatic tire 1 on the specified rim, and the pneumatic tire 1 is mounted on the rim wheel. Once mounted on the rim, the pneumatic tire 1 is inflated, and the pneumatic tire 1 inflated is mounted on the vehicle. The pneumatic tire 1 according to the present embodiment is used, for example, as the pneumatic tire 1 for a construction vehicle, the pneumatic tire 1 to be mounted in a construction vehicle such as a wheel loader.

In a case where the vehicle equipped with the pneumatic tire 1 is driven, the pneumatic tire 1 rotates with the ground contact surface 3 of the ground contact surface 3 located on a lower side in contact with the road surface. The vehicle is driven by transferring a driving force or a braking force to the road surface, using the frictional force between the ground contact surface 3 and the road surface, or by generating a turning force. For example, in a case where the driving force is transferred to the road surface, power generated by a prime mover such as an engine of the vehicle is transferred to the rim wheel, and then transferred from the rim wheel to the pneumatic tire 1.

Here, the rim wheel and the pneumatic tire 1 are mounted on each other by a fastening force corresponding to the fitting force exerted on the specified rim R of the rim wheel by the bead portion 20 of the pneumatic tire 1, that is, the rim wheel and the pneumatic tire 1 are mounted between the bead portion 20 and the rim wheel by a friction force. The fastening force by the bead portion 20 is ensured by the bead core 21 formed by winding the bead wire in a ring shape.

In other words, in a case where the pneumatic tire 1 is mounted on the rim wheel, the rubber member such as the rim cushion rubber 60 located on the inner side of bead core 21 of the bead portion 20 in the tire radial direction is compressed between the bead core 21 and the specified rim R, causing the pneumatic tire 1 to exert, on the specified rim R, pressure acting toward the inner side in the tire radial direction. The pressure acts as the fastening force on the specified rim R by the bead portion 20, and the fastening force generates a high friction force between the pneumatic tire 1 and the specified rim R to fit the pneumatic tire 1 to the specified rim R to mount the pneumatic tire 1 on the rim wheel.

Since the pneumatic tire 1 is thus mounted on the rim wheel by the friction force associated with the fastening force of the bead portion 20, in a case where, compared to the friction force, a high rotational torque is generated between the pneumatic tire 1 and the rim wheel, slippage may occur between the pneumatic tire 1 and the rim wheel. For example, in a case where the bead portion 20 exerts a weak fastening force and a high rotational torque is transferred from the rim wheel to the pneumatic tire 1, the rotational torque overcomes a restricting force caused by the friction force between the bead portion 20 and the rim wheel, and slippage may occur between the bead portion 20 and the rim wheel. The pneumatic tire 1 according to the present embodiment is configured to enable slippage between the bead portion 20 and the rim wheel to be suppressed.

Specifically, a portion of the specified rim R of the rim wheel that is fitted to the bead base portion 30 of the pneumatic tire 1 is inclined at an angle of 5°±1° with respect to the rotation axis of the rim wheel, while the bead core 21 has the bead core bottom 23 formed at an inclination angle A1 within the range of 0° or more and 5° or less with respect to the tire rotation axis. Thus, the bead core 21 can appropriately compress the rubber member such as the rim cushion rubber 60 located between the 5°-tapered specified rim R and the bead core 21 over a predetermined range in the tire width direction, to exert the appropriate fastening force on the specified rim R.

Additionally, the bead portion 20 includes the bead base portion 30 that comes into actual contact with the specified rim R and is inclined in a range of 8° or more and 12° or less with respect to the tire rotation axis, thus allowing the appropriate fastening force to be ensured without degrading the mountability on rims. That is, when the inclination angle A2 of the bead base portion 30 with respect to the tire rotation axis is less than 8°, the diameter in the tire radial direction at a position near the toe portion 32 in the bead base portion 30 increases. Accordingly, the fastening force on the toe portion 32 side is likely to weaken. Additionally, when the inclination angle A2 of the bead base portion 30 with respect to the tire rotation axis exceeds 12°, the diameter in the tire radial direction at the position near the toe portion 32 in the bead base portion 30 decreases. Accordingly, when the pneumatic tire 1 is mounted on a rim wheel, the mounting on the rim becomes difficult. In contrast, when the inclination angle A2 of the bead base portion 30 with respect to the tire rotation axis is of 8° or more and 12° or less, the fastening force of the specified rim R by the bead portion 20 can be ensured while the mountability on rims is ensured.

Additionally, since the rim cushion rubber 60 has the modulus at 100% elongation indicative of elastic modulus within a range of 5.0 MPa or more and 8.0 MPa or less, rim slippage can be suppressed by ensuring an appropriate fastening force without degrading the mountability on rims. In other words, when the modulus at 100% elongation of the rim cushion rubber 60 is less than 5.0 MPa, since the elastic modulus of the rim cushion rubber 60 is excessively small, ensuring the fastening force of the bead portion 20 to the specified rim R is possibly difficult. In this case, suppressing the slippage between the bead portion 20 and the rim wheel is possibly difficult. Additionally, when the modulus at 100% elongation of the rim cushion rubber 60 is greater than 8.0 MPa, the elastic modulus of the rim cushion rubber 60 is excessively large, so the fastening force of the bead portion 20 to the specified rim R becomes excessively great, and the mounting on the rim is possibly difficult when the pneumatic tire 1 is mounted on the rim wheel. In contrast, when the modulus at 100% elongation of the rim cushion rubber 60 is within a range of 5.0 MPa or more and 8.0 MPa or less, the fastening force of the specified rim R by the bead portion 20 can be ensured while the mountability on rims is ensured.

Additionally, since the radius of curvature R1 of the heel portion 35 formed in the arc shape in the tire meridian cross-section is within a range of 25 mm or more and 30 mm or less, while reducing a frictional resistance between the bead portion 20 and the rim wheel to ensure the mountability on rims, rim slippage can be suppressed by ensuring the appropriate fastening force. In other words, when the radius of curvature R1 of the heel portion 35 is less than 25 mm, the radius of curvature R1 of the heel portion 35 is excessively small, so during the mounting on the specified rim R, an amount of rubber compressed at the position near the heel portion 35 in the bead portion 20 possibly becomes excessively large. This possibly results in an excessively great fastening force of the bead portion 20 to the specified rim R at the position near the heel portion 35 and the frictional resistance between the bead portion 20 and the rim wheel is likely to increase. Accordingly, when the pneumatic tire 1 is mounted on a rim wheel, mounting on the rim is possibly difficult. Additionally, when the radius of curvature R1 of the heel portion 35 is greater than 30 mm, the radius of curvature R1 of the heel portion 35 is excessively large, so the diameter in the tire radial direction at the position near the heel portion 35 of the bead portion 20 increases, making it easier to weaken the fastening force near the heel portion 35. In this case, suppressing the slippage between the bead portion 20 and the rim wheel is possibly difficult. In contrast, when the radius of curvature R1 of the heel portion 35 is within a range of 25 mm or more and 30 mm or less, the fastening force of the specified rim R by the bead portion 20 can be ensured while the mountability on rims is ensured.

Additionally, since the amount of displacement Dt of the toe portion 32 in the tire radial direction between before and after the mounting on the specified rim R is within a range of 9.0 mm or more and 13.5 mm or less, rim slippage can be suppressed by ensuring the appropriate fastening force while the mountability on rims is ensured by reducing the frictional resistance between the bead portion 20 and the rim wheel. That is, when the amount of displacement Dt in the tire radial direction of the toe portion 32 is less than 9.0 mm, the amount of compression of the rubber near the toe portion 32 during mounting on the specified rim R is reduced, which possibly makes it difficult to ensure the fastening force on the specified rim R at the position near the toe portion 32. In this case, suppressing the slippage between the bead portion 20 and the rim wheel is possibly difficult. When the amount of displacement Dt of the toe portion 32 in the tire radial direction is greater than 13.5 mm, during the mounting on the specified rim R, the amount of rubber compressed at the position near the toe portion 32 in the bead portion 20 possibly becomes excessively large. This possibly results in an excessively great fastening force of the bead portion 20 to the specified rim R at the position near the toe portion 32 and the frictional resistance between the bead portion 20 and the rim wheel is likely to increase. Accordingly, when the pneumatic tire 1 is mounted on a rim wheel, the mounting on the rim is possibly difficult. In contrast, when the amount of displacement Dt of the toe portion 32 in the tire radial direction is within a range of 9.0 mm or more and 13.5 mm or less, the fastening force of the specified rim R by the bead portion 20 can be ensured while the mountability on rims is ensured. This allows providing the improved mountability on rims and ensuring the fastening force generated in the bead portions 20 in a compatible manner. As a result, rim slippage can be suppressed with the mountability on rims ensured.

Additionally, in the bead portion 20, with the pneumatic tire 1 mounted on the specified rim R, the compression ratio Z of the rubber located on the inner side of the bead core 21 in the tire radial direction is within the range of 45% or more and 55% or less at a position on the inner side of the bead core bottom center 24 in the tire radial direction in the tire meridian cross-section. Accordingly, it is possible to provide reducing the frictional resistance between the bead portion 20 and the rim wheel and ensuring the fastening force of the bead portion 20 in a compatible manner more reliably. In other words, in a case where the compression ratio Z is less than 45%, the compression ratio Z is excessively low and may make ensuring the fastening force of the bead portion 20 difficult. In this case, effectively suppressing slippage between the bead portion 20 and the rim wheel may be difficult. Additionally, in a case where the compression ratio Z exceeds 55%, the compression ratio Z is excessively high, and this may cause the rim cushion rubber 60 located on the inner side of the bead core 21 in the tire radial direction to be excessively deformed, making the fastening force of the bead portion 20 likely to be increased. In this case, effectively reducing the frictional resistance when the pneumatic tire 1 is mounted on a rim is difficult, and ensuring the mountability on rims is possibly difficult.

In contrast, when the compression ratio Z is within a range of 45% or more and 55% or less, while the frictional resistance between the bead portion 20 and the rim wheel when the pneumatic tire 1 is mounted on a rim can be more reliably reduced, the fastening force of the bead portion 20 to the specified rim R can be ensured. As a result, rim slippage can be suppressed with mountability on rims more reliably ensured.

Additionally, in the carcass 6, the radius of curvature R2 in the tire meridian cross-section at the position on the inner side in the tire radial direction of the bead core bottom 23 is in a range of 50 mm or more and 70 mm or less, and the relationship with the radius of curvature R1 of the heel portion 35 is R1<R2. Accordingly, while durability of the bead portion 20 can be ensured, the mountability on rims can be more reliably ensured, and slippage between the bead portion 20 and the rim wheel can be more reliably suppressed. In other words, when the radius of curvature R2 of the carcass 6 is less than 50 mm or the relationship between the radius of curvature R2 of the carcass 6 and the radius of curvature R1 of the heel portion 35 is R1≥R2, the radius of curvature R2 of the carcass 6 at the position on the inner side in the tire radial direction of the bead core bottom 23 is possibly excessively small. This possibly locally increases the fastening force of the bead portion 20 when the pneumatic tire 1 is mounted on a rim wheel, that is, a contact pressure of the bead portion 20 to the specified rim R is possibly locally increased. In a case where the contact pressure to the specified rim R is locally increased, the frictional resistance is partially increased when the pneumatic tire 1 is mounted on the rim. This makes ensuring the mountability on rims difficult and is likely to produce portions with a low fastening force. Accordingly, effectively suppressing the slipping between the bead portion 20 and the rim wheel may be difficult. When the radius of curvature R2 of the carcass 6 is greater than 70 mm, since the radius of curvature R2 of the carcass 6 at the position on the inner side of the bead core bottom 23 in the tire radial direction is excessively large, the radius of curvature of the carcass 6 is possibly easily changed suddenly between the position on the inner side in the tire radial direction of the bead core bottom 23 and a position other than that. In this case, the contact pressure of the bead portion 20 to the specified rim R is also easily changed suddenly between the position on the inner side in the tire radial direction of the bead core bottom 23 and a position other than that. Thus, a failure of the bead portion 20 is possibly likely to occur caused by the sudden change in the contact pressure.

In contrast, when the radius of curvature R2 of the carcass 6 is in a range of 50 mm or more and 70 mm or less and the relationship between the radius of curvature R2 of the carcass 6 and the radius of curvature R1 of the heel portion 35 is R1<R2, the local increase in fastening force of the bead portion 20 and the sudden change in the contact pressure of the bead portion 20 can be suppressed, and the fastening force of the bead portion 20 to the specified rim R can be generated over a wide range in the tire width direction while the contact pressure is smoothly changed. This suppresses the partial increase in frictional resistance when the tire is mounted on the rim. Additionally, the failure in the bead portions 20 can be suppressed, and the slippage between the bead portions 20 and the rim wheel can be more reliably suppressed. As a result, rim slippage can be suppressed with the mountability on rims more reliably ensured and further bead durability can be improved.

Since the relationship between the maximum width W1 in the tire meridian cross-section of the bead core 21 and the bead width W2, which is the distance between the bead core outer end portion 27 and the leading edge portion 33 of the toe portion 32 in the tire width direction, is within the range 0.65≤(W1/W2)≤0.75, the mountability on rims can be more reliably ensured with separation of members around the bead core 21 can be suppressed and the slippage between the bead portion 20 and the rim wheel can be more reliably suppressed. In other words, in a case where relationship between the maximum width W1 of the bead core 21 and the bead width W2 is (W1/W2)<0.65, since the maximum width W1 of the bead core 21 is excessively small, when the pneumatic tire 1 is mounted on a rim wheel, the fastening force of the bead base portion 30 located on the inner side of the bead core 21 in the tire radial direction is locally increased, possibly resulting in the local increase in contact pressure of the bead base portion 30 on the specified rim R. In this case, the frictional resistance is partially increased when the pneumatic tire 1 is mounted on the rim. This makes ensuring the mountability on rims difficult and is likely to produce portions with a low fastening force. Accordingly, effectively suppressing the slipping between the bead portion 20 and the rim wheel may be difficult. Additionally, in a case where the relationship between the maximum width W1 of the bead core 21 and the bead width W2 is (W1/W2) >0.75, the bead core 21 has the excessively large maximum width W1. Accordingly, excessively significant distortion may occur around the bead core 21 in a case where a heavy load is applied to the bead portion 20. In this case, the significant distortion may cause separation between the bead core 21 and the rubber member surrounding the bead core 21 or between the member such as the carcass 6 or the steel chafer 55 located around the bead core 21 and the surrounding rubber member.

In contrast, in a case where the relationship between the maximum width W1 of the bead core 21 and the bead width W2 is represented within the range 0.65≤(W1/W2)≤0.75, a local increase in fastening force of the bead base portion 30 can be suppressed, and the fastening force on the specified rim R by the bead base portion 30 can be generated over a wide range where excessively significant distortion occurring around the bead core 21 can be suppressed. As a result, the partial increase in frictional resistance during the mounting on the rim is suppressed, separation of the members around the bead cores 21 can be suppressed, and the slippage between the bead portions 20 and the rim wheel can be more reliably suppressed. As a result, rim slippage can be suppressed with the mountability on rims more reliably ensured and further bead durability can be improved.

In the pneumatic tire 1 according to the embodiment described above, the bead portion 20 includes one carcass 6 and the three chafers of the steel chafer 55 and the sub-chafers 56 and 57 as reinforcing layers. However, the reinforcing layers may have a configuration other than this. For example, two or more carcasses 6 may be disposed, or two or less chafers may be provided or the chafers may be omitted.

EXAMPLES

FIGS. 5A and 5B are tables showing results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. The performance evaluation tests were conducted on tests of rim slip resistance indicating performance against rim slippage and mountability on rims indicating the easiness of mounting on the rim.

The performance evaluation test was performed using pneumatic tires having a tire nominal size of 35/65R33 as test tires, the test tires were mounted on rim wheels with a rim size of 33×28.00/3.5, and air pressures were adjusted to be 650 kPa. As the evaluation method of each test item, rim slip resistance was evaluated by a rim slip torque test. In the rim slip torque test, a relative torque in the tire circumferential direction was applied to the rim-mounted test tire and the rim wheel, while a deviation amount between the test tire and the rim wheel was visually checked, the torque was gradually increased, and a torque value when a deviation with a magnitude at which occurrence of a rim slippage was able to be determined was measured. In the rim slip resistance, the measured torque value is expressed as an index value with Conventional Example described later being assigned the value of 100. Larger values indicate less likelihood of deviation between the test tire and the rim wheel in the tire circumferential direction and superior rim slip resistance.

Additionally, for mountability on rims, an operator measured the time required to mount the test tire on the rim wheel with no eccentric fitting and inflated the tire to an internal pressure. The reciprocal of the measured time was expressed as an index value with Conventional Example described later being assigned the value of 100. Larger index values indicate shorter required time and superior mountability on rims. Note that the presence of eccentric fitting is checked by visual inspection with the rim check line 9.

The performance evaluation tests were performed on 19 types of pneumatic tires including a pneumatic tire according to Conventional Example corresponding to an example of a conventional pneumatic tire, Examples 1 to 16 corresponding to the pneumatic tires 1 according to the embodiments of the present technology, and Comparative Examples 1 and 2 corresponding to pneumatic tires to be compared with the pneumatic tires 1 according to the embodiments of the present technology. Among them, in the pneumatic tire of Conventional Example, the radius of curvature R1 of the heel portion 35 of the bead portion 20 is less than 25 mm, the modulus at 100% elongation of the rim cushion rubber 60 is less than 5.0 MPa, and the amount of displacement Dt of the toe portion 32 is less than 9.0 mm. Additionally, in the pneumatic tire of Comparative Example 1, the radius of curvature R1 of the heel portion 35 is greater than 30 mm. In the pneumatic tire of Comparative Example 2, the amount of displacement Dt of the toe portion 32 is greater than 13.5 mm.

In contrast, in Examples 1 to 16, which are examples of the pneumatic tires 1 according to the embodiments of the present technology, all of the radii of curvature R1 of the heel portions 35 are in a range of 25 mm or more and 30 mm or less, the moduli at 100% elongation of the rim cushion rubbers 60 are in a range of 5.0 MPa or more and 8.0 MPa or less, and the amounts of displacement Dt of the toe portions 32 are in a range of 9.0 mm or more and 13.5 mm or less. Furthermore, the pneumatic tires 1 according to embodiments 1 to 16 differ in the compression ratio Z of the rubber located on the inner side of the bead core 21 in the tire radial direction, the relationship between the maximum width W1 of the bead core 21 and the bead width W2 (W1/W2), the relationship between the radius of curvature R1 of the heel portion 35 and the radius of curvature R2 of the carcass 6, and the magnitude of the radius of curvature R2 of the carcass 6.

As a result of the performance evaluation tests using the pneumatic tires 1, as shown in FIGS. 5A and 5B, the pneumatic tires 1 according to Examples 1 to 16 are found to allow the mountability on rims to be improved without degrading the rim slip resistance compared to Conventional Example. In other words, the pneumatic tires 1 according to Examples 1 to 16 can suppress rim slippage with the mountability on rims ensured.

The invention claimed is:

1. A pneumatic tire to be mounted on a 5°-tapered specified rim, comprising:
a pair of bead portions disposed on both sides of a tire equatorial plane in a tire width direction;
a bead core provided in each of the pair of bead portions; and
a rim cushion rubber disposed on an inner side in a tire radial direction of the bead core in each of the pair of bead portions;
the bead core having a hexagonal shape in a tire meridian cross-section, a bead core bottom as an inner circumferential surface of the bead core being inclined within a range of 0° or more and 5° or less with respect to a tire rotation axis in a direction in which the bead core bottom diverges toward an outer side in a tire radial direction as the bead core bottom extends from an inner side in the tire width direction toward an outer side in the tire width direction,
each of the pair of bead portions comprising a bead base portion, a toe portion, and a heel portion, the bead base portion being an inner circumferential surface of each of the pair of bead portions, the toe portion being located on an inner side of the bead base portion in the tire width direction, the heel portion being located on an outer side of the bead base portion in the tire width direction,
the bead base portion being linearly formed in the tire meridian cross-section, the bead base portion being inclined within a range of 8° or more and 12° or less with respect to the tire rotation axis in a direction in which the bead base portion diverges toward the outer side in the tire radial direction as the bead base portion extends from the inner side in the tire width direction toward the outer side in the tire width direction,
the heel portion having a shape in the tire meridian cross-section formed in an arc shape having a radius of curvature within a range of 25 mm or more and 30 mm or less,
the rim cushion rubber having a modulus at 100% elongation within a range of 5.0 or more MPa and 8.0 MPa or less, and
the toe portion having an amount of displacement in the tire radial direction between before and after mounting on the specified rim within a range of 9.0 mm or more and 13.5 mm or less, wherein
a relationship between a maximum width W1 in the tire meridian cross-section of the bead core and a bead width W2 as a distance in the tire width direction between an outer end portion of the bead core in the tire width direction and a leading edge portion of the toe portion is within a range $0.65 \leq (W1/W2) \leq 0.75$.

2. The pneumatic tire according to claim 1, wherein when the pneumatic tire is mounted on the specified rim, a compression ratio of a rubber located on the inner side of the bead core in the tire radial direction is within a range of 45% or more and 55% or less at a position on an inner side in the tire radial direction of a center of the bead core bottom in the tire meridian cross-section.

3. The pneumatic tire according to claim 2, comprising a carcass extended between the pair of the bead portions, the carcass running through the inner side in the tire radial direction of the bead core and being folded back in the tire width direction in each of the pair of bead portions, wherein
the carcass has a radius of curvature R2 in the tire meridian cross-section at a position on an inner side in the tire radial direction of the bead core bottom within a range of 50 mm or more and 70 mm or less, and the radius of curvature R2 has a relationship with a radius of curvature R1 of the heel portion in the tire meridian cross-section of R1<R2.

4. A pneumatic tire to be mounted on a 5°-tapered specified rim, comprising:
a pair of bead portions disposed on both sides of a tire equatorial plane in a tire width direction;
a bead core provided in each of the pair of bead portions;
a rim cushion rubber disposed on an inner side in a tire radial direction of the bead core in each of the pair of bead portions; and
a carcass extended between the pair of the bead portions, the carcass running through the inner side in the tire radial direction of the bead core and being folded back in the tire width direction in each of the pair of bead portions;
the bead core having a hexagonal shape in a tire meridian cross-section, a bead core bottom as an inner circumferential surface of the bead core being inclined within a range of 0° or more and 5° or less with respect to a tire rotation axis in a direction in which the bead core bottom diverges toward an outer side in a tire radial direction as the bead core bottom extends from an inner side in the tire width direction toward an outer side in the tire width direction,
each of the pair of bead portions comprising a bead base portion, a toe portion, and a heel portion, the bead base portion being an inner circumferential surface of each of the pair of bead portions, the toe portion being located on an inner side of the bead base portion in the tire width direction, the heel portion being located on an outer side of the bead base portion in the tire width direction,
the bead base portion being linearly formed in the tire meridian cross-section, the bead base portion being inclined within a range of 8° or more and 12° or less with respect to the tire rotation axis in a direction in which the bead base portion diverges toward the outer side in the tire radial direction as the bead base portion extends from the inner side in the tire width direction toward the outer side in the tire width direction,
the heel portion having a shape in the tire meridian cross-section formed in an arc shape having a radius of curvature within a range of 25 mm or more and 30 mm or less,
the rim cushion rubber having a modulus at 100% elongation within a range of 5.0 or more MPa and 8.0 MPa or less,
the toe portion having an amount of displacement in the tire radial direction between before and after mounting on the specified rim within a range of 9.0 mm or more and 13.5 mm or less, wherein
the carcass has a radius of curvature R2 in the tire meridian cross-section at a position on an inner side in the tire radial direction of the bead core bottom within a range of 50 mm or more and 70 mm or less, and the radius of curvature R2 has a relationship with a radius of curvature R1 of the heel portion in the tire meridian cross-section of R1<R2.

5. A pneumatic tire to be mounted on a 5°-tapered specified rim, comprising:
a pair of bead portions disposed on both sides of a tire equatorial plane in a tire width direction;
a bead core provided in each of the pair of bead portions; and
a rim cushion rubber disposed on an inner side in a tire radial direction of the bead core in each of the pair of bead portions;
the bead core having a hexagonal shape in a tire meridian cross-section, a bead core bottom as an inner circumferential surface of the bead core being inclined within a range of 0° or more and 5° or less with respect to a tire rotation axis in a direction in which the bead core bottom diverges toward an outer side in a tire radial direction as the bead core bottom extends from an inner side in the tire width direction toward an outer side in the tire width direction,
each of the pair of bead portions comprising a bead base portion, a toe portion, and a heel portion, the bead base portion being an inner circumferential surface of each of the pair of bead portions, the toe portion being located on an inner side of the bead base portion in the tire width direction, the heel portion being located on an outer side of the bead base portion in the tire width direction,
the bead base portion being linearly formed in the tire meridian cross-section, the bead base portion being inclined within a range of 8° or more and 12° or less with respect to the tire rotation axis in a direction in which the bead base portion diverges toward the outer side in the tire radial direction as the bead base portion extends from the inner side in the tire width direction toward the outer side in the tire width direction,
the heel portion having a shape in the tire meridian cross-section formed in an arc shape having a radius of curvature within a range of 25 mm or more and 30 mm or less,
the rim cushion rubber having a modulus at 100% elongation within a range of 5.0 or more MPa and 8.0 MPa or less,
the toe portion having an amount of displacement in the tire radial direction between before and after mounting on the specified rim within a range of 9.0 mm or more and 13.5 mm or less, wherein:
the inner circumferential surface of the bead core is inclined within a range of 0° or more and 4° or less with respect to the tire rotation axis in the direction in which the bead core bottom diverges toward the outer side in the tire radial direction as the bead core bottom extends from the inner side in the tire width direction toward the outer side in the tire width direction, and
the bead base portion is inclined within a range of 9° or more and 12° or less with respect to the tire rotation axis in the direction in which the bead base portion diverges toward the outer side in the tire radial direction as the bead base portion extends from the inner side in the tire width direction toward the outer side in the tire width direction.

* * * * *